(No Model.)

R. SCHAELLIBAUM.
BEATER FOR COTTON OPENERS.

No. 503,256. Patented Aug. 15, 1893.

Witnesses

Inventor
Robert Schaellibaum
his Attorney

United States Patent Office.

ROBERT SCHAELLIBAUM, OF LOWELL, MASSACHUSETTS.

BEATER FOR COTTON-OPENERS.

SPECIFICATION forming part of Letters Patent No. 503,256, dated August 15, 1893.

Application filed November 28, 1892. Serial No. 453,411. (No model.)

*To all whom it may concern:*

Be it known that I, ROBERT SCHAELLIBAUM, of Lowell, in the State of Massachusetts, have invented a new and useful Improvement in Beaters for Cotton-Openers and Analogous Machinery, of which the following is a specification.

The object of my invention is to produce, for use in openers or lappers for cotton or other fibers, a beater with practically but one blade, instead of two or more blades as at present, without requiring any extra weight for balancing the blade. To this end I provide the beater with blade sections which, extending across the working width of the machine in which the beater is used, are practically the equivalent of a single blade, although they may overlap one another at their ends—the sections being so placed around the shaft or axis of the beater and relatively to one another, that they will in themselves balance each other and form a balanced beater without the employment of extra weight, either in the shape of a second counterbalancing blade (whether sectional or otherwise) or in the shape of some other extraneous counterbalance weight. This I believe to be new with me. So far as I am informed no beater has heretofore been produced having but a single blade and yet balanced without the aid of counter-balancing means extraneous to the single blade itself.

Figure 1:
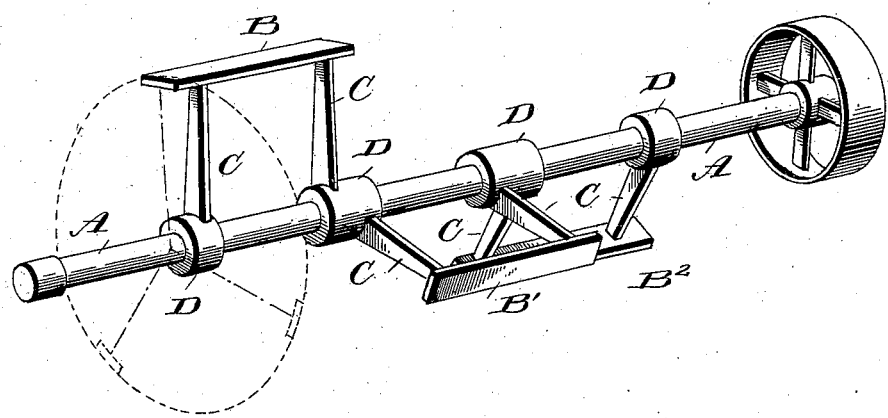
Figure 2:
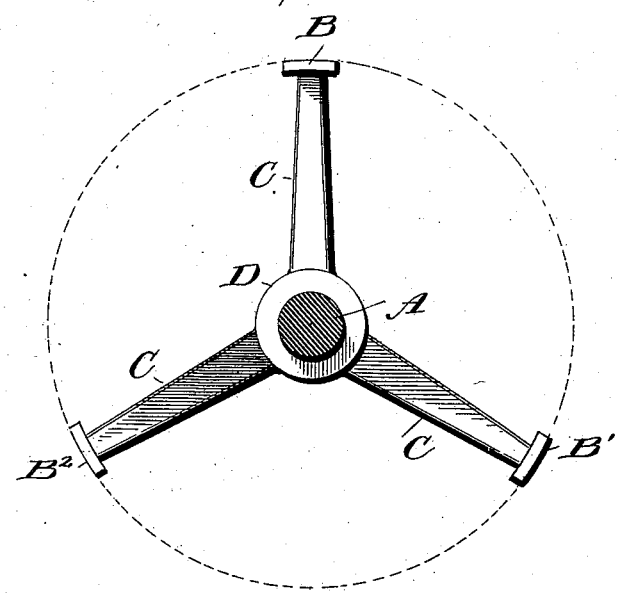

In the accompanying drawings—Figure 1 is a view of a beater made in accordance with my invention. Fig. 2 is an end elevation of the same.

The beater shaft which carries the beater blade is represented at A. The single blade, which may be divided into any suitable number of sections, is divided in this instance into three sections B, B', B². These sections may overlap one another more or less, and in the drawings are represented as overlapping one another; but they in effect are the substantial equivalent of a single beater blade. They are held to the shaft A by spider arms C supported on hubs or sleeves D mounted on the shaft and secured in place thereon by any suitable means. The blade sections are placed one after the other on the shaft so as to extend from one end to the other of the working length of the beater. But instead of being put end to end, they are set around the shaft at such angle to one another that they will, without any other weight, balance each other. To this end they are set in the present instance each at an angle of one hundred and twenty degrees to the others, as indicated in Fig. 2. In this way I obtain a single blade beater which requires no extra weight to balance it. An advantage attending the construction is that the stroke of the blade is subdivided—that is, successive portions of the single blade act upon the material at equal intervals of time apart, and thus the beater can maintain a more even speed of revolution.

I am aware that the blades of beaters have been divided into sections set at angles to each other, so that the sections of the same blade will strike successively, and this I do not claim. In such case, however, so far as I am informed, at least two complete blades have been used, the one acting as a counterbalance to the other; and the sections of any one of the blades have been extended along the shaft in a spiral path covering not more than one hundred and eighty degrees or half a circle.

What I claim, and desire to secure by Letters Patent, is—

A beater for cotton openers and like machinery, having a single blade, divided into sections which taken together constitute practically a single beater blade extending the working length of the beater, and arranged relatively to one another around the axis of the beater to balance each other, substantially as and for the purposes hereinbefore set forth.

In testimony whereof I affix my signature in presence of two witnesses.

ROBERT SCHAELLIBAUM.

Witnesses:
WILLIAM F. HARRISON,
L. ELMER WOOD.